United States Patent
Yamashita

[11] Patent Number: 5,887,683
[45] Date of Patent: Mar. 30, 1999

[54] BRAKE ADJUSTING DEVICE

[75] Inventor: Kazuhisa Yamashita, Sakai, Japan

[73] Assignee: Shimano Inc., Osaka, Japan

[21] Appl. No.: 774,053

[22] Filed: Dec. 23, 1996

[51] Int. Cl.$^6$ .................................................. B62L 1/06
[52] U.S. Cl. .................................. 188/24.19; 188/24.21; 188/25; 188/72.3
[58] Field of Search .......................... 18/24.11, 24.12, 18/24.19, 24.21, 24.2, 25, 71.8, 72.3; 192/70.28

[56] References Cited

U.S. PATENT DOCUMENTS

| | | | |
|---|---|---|---|
| 599,278 | 2/1898 | Wolf | 188/25 |
| 605,728 | 6/1898 | Ballister | 188/25 |
| 3,680,663 | 8/1972 | Kine | 188/24 |
| 4,546,858 | 10/1985 | Nagano | 188/24.19 |
| 5,107,965 | 4/1992 | Yates | 188/24.22 |
| 5,293,965 | 3/1994 | Nagano | 188/24.21 |

FOREIGN PATENT DOCUMENTS

| | | |
|---|---|---|
| 51-95156 | 1/1976 | Japan . |
| 3219127 | 9/1991 | Japan . |
| 3118326 | 12/1991 | Japan . |
| 13598 | 1/1902 | Sweden ................................... 188/25 |

*Primary Examiner*—Lee W. Young
*Attorney, Agent, or Firm*—Shinjyu Global IP Counselors, LLP

[57] ABSTRACT

A braking device with brake adjusting devices disclosed for maintaining the proper spacing between the brake pad and the rim of the bicycle wheel or the brake disc attached to the bicycle wheel. Each of the brake adjusting devices preferably includes a spacing element and a support member which is coupled to the brake device. Of course, the support member can be coupled directly to the friction pad via a resilient biasing portion or coupled to various parts of the braking device. The spacing element is preferably biased against the rim or brake disc so as to apply a constant force thereto for obtaining the proper pad spacing when the braking device is in its release position. If a support member is used, the support member can have an attachment portion which is coupled to the brake shoe or friction pad support, a retaining member supporting the spacing element and a biasing portion located between the attachment portion and the retaining portion. Preferably, the spacing element is a roller or ball. However, the spacing element can be a smooth non-rotatable element.

36 Claims, 8 Drawing Sheets

BRAKE ADJUSTING DEVICE

FIELD OF THE INVENTION

The present invention generally relates to a brake adjusting device, especially for use with a bicycle brake. More specifically, the present invention is directed to a brake adjusting device to obtain the desired spacing between the brake pad and the rim of the bicycle wheel or the brake disc attached to the bicycle wheel.

BACKGROUND OF THE INVENTION

Bicycling is becoming an increasingly more popular form of recreation as well as a means of transportation. Moreover, bicycling has also become a very popular competitive sport. Whether the bicycle is used for recreation, transportation or competition, the bicycle industry is constantly improving their components. One particular component of bicycles which has been extensively redesigned over the past years is the operation of the brakes.

It has been discovered that it is desirable to adjust the brakes so that the friction pads are as close as possible to the friction member, e.g., the rim of the wheel or the brake disc. However, one drawback with a small gap between the friction pads and friction member is that the friction pads may rub against the friction member which will reduce the performance of the bicycle.

In view of the above, there exits a need for a brake adjusting device which obtains the desired spacing between the brake pad and the friction member, e.g., the rim of the bicycle wheel or the brake disc attached to the bicycle wheel. This invention addresses this need in the art as well as other needs in the art which will become apparent to those skilled in the art from this disclosure.

SUMMARY OF THE INVENTION

One object of the present invention is to provide brake adjusting devices which obtain the desired spacing between the brake pad and friction member, e.g., the rim of the bicycle wheel or the brake disc attached to the bicycle wheel.

Another object of the present invention is to provide brake adjusting devices which can be used with existing braking devices.

Still another object of the present invention is to provide a brake adjusting device which is relatively inexpensive to manufacture.

The foregoing objects can basically be attained by providing a brake adjusting device for obtaining desired brake pad spacing, comprising a spacing element adapted to contact a friction member coupled to a wheel for rotation therewith; and a support member coupled to the spacing element, the support member including an attachment portion adapted to be coupled to a braking device, a biasing portion maintaining the spacing element in contact with the friction member with a predetermined force, and a retaining portion coupling the spacing element to the support member.

In the illustrated embodiment of the present invention, the brake adjusting devices each include a rotatable spacing element. For example, the rotatable spacing element can be a roller or ball. Of course, in other embodiments of the present invention which are not shown, the spacing element can be a non-rotatable member having a smooth contact surface with a low coefficient of friction.

The brake adjusting devices of the present invention can be coupled to a wide variety of braking devices, including but not limited to side pull type caliper brakes, center pull type caliper brakes, cantilever type caliper brakes, disc brakes, etc.

In the illustrated embodiments, the brake adjusting devices are coupled to the brake shoe. Of course, it will be apparent to those skilled in the art from this disclosure that the brake adjusting devices can be coupled to other parts of the braking device. For example, the brake adjusting devices can be embedded in the friction pad. Also, two or more adjusting devices can be used with each friction pad as needed and/or desired.

Moreover, the brake adjusting devices can be positioned at different locations relative to the brake pads as needed and/or desired. For example, the brake adjusting devices can be positioned before or after the brake pads as well as between the forward and rearward ends of the brake pads. In addition, a combination of brake adjusting devices may be used at various locations as needed and/or desired.

Other objects, advantages and salient features of the present invention will become apparent to those skilled in the art from the following detailed description, which, taken in conjunction with the annexed drawings discloses four preferred embodiments of the present invention.

BRIEF DESCRIPTION OF THE DRAWINGS

Referring now to the attached drawings which form part of this original disclosure.

DETAILED DESCRIPTION OF THE PREFERRED EMBODIMENTS

Figure 1:
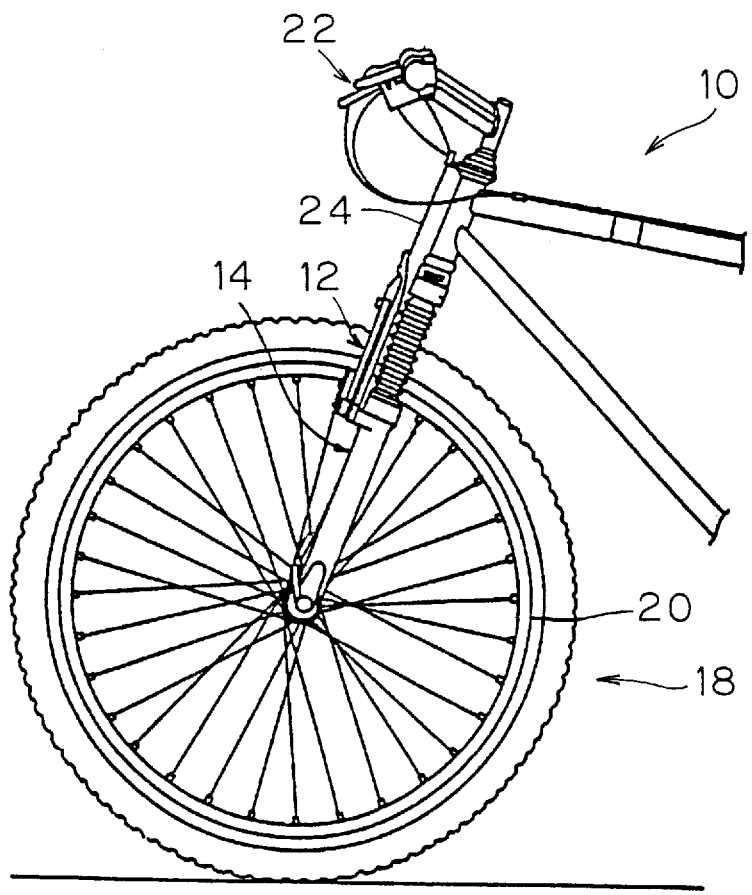
FIG. 1 is a partial, side elevational view of a conventional bicycle using a braking device in accordance with the present invention.
Figure 2:
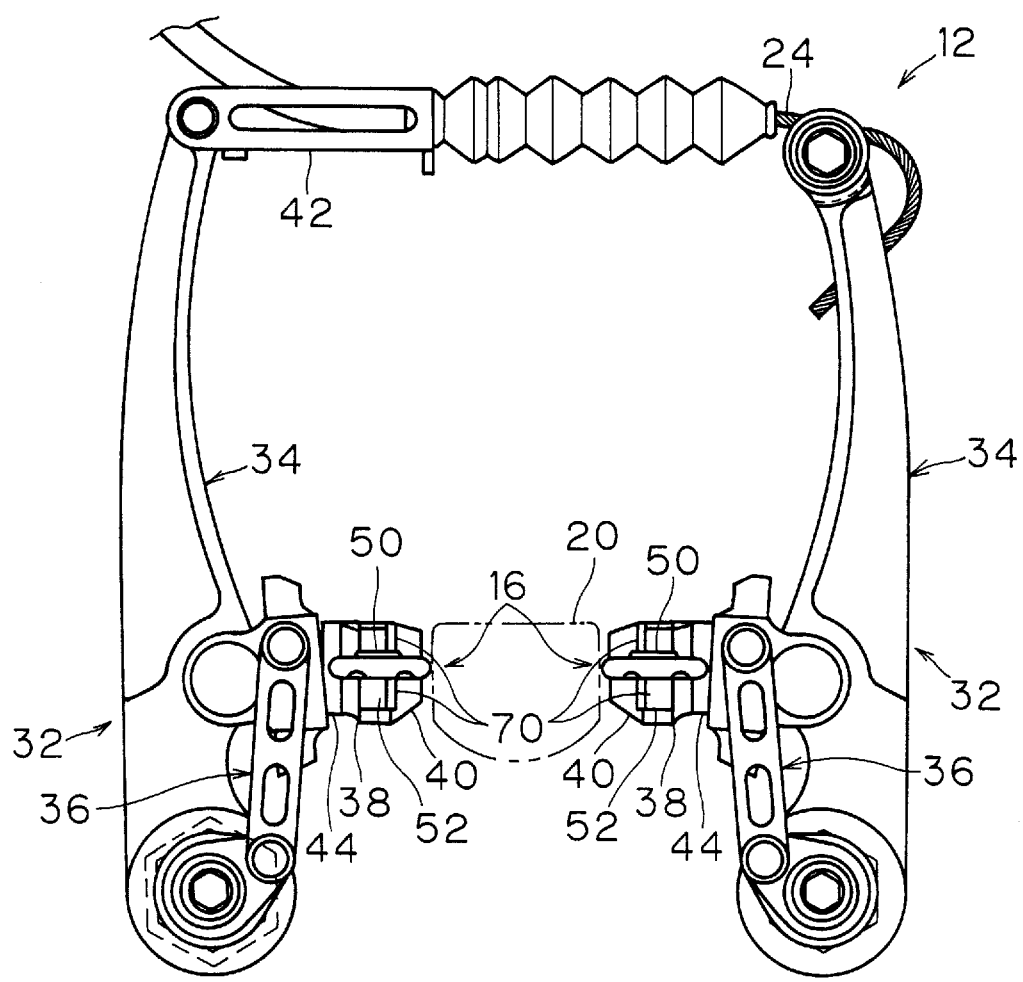
FIG. 2 is a partial front elevational view of a braking device with brake adjusting devices attached thereto and extending in a forward direction therefrom in accordance with a first embodiment of the present invention.

Referring initially to FIGS. 1 and 2, a conventional bicycle 10 is illustrated having a bicycle braking device 12 in accordance with the present invention. Bicycles and their various components are well-known in the prior art, and thus, bicycle 10 and its various components will not be discussed or illustrated in detail herein, except for the components of bicycle 10 which relate to braking device 12 in accordance with the present invention. In other words, only bicycle braking device 12 will be discussed and illustrated in detail herein.

Figure 3:
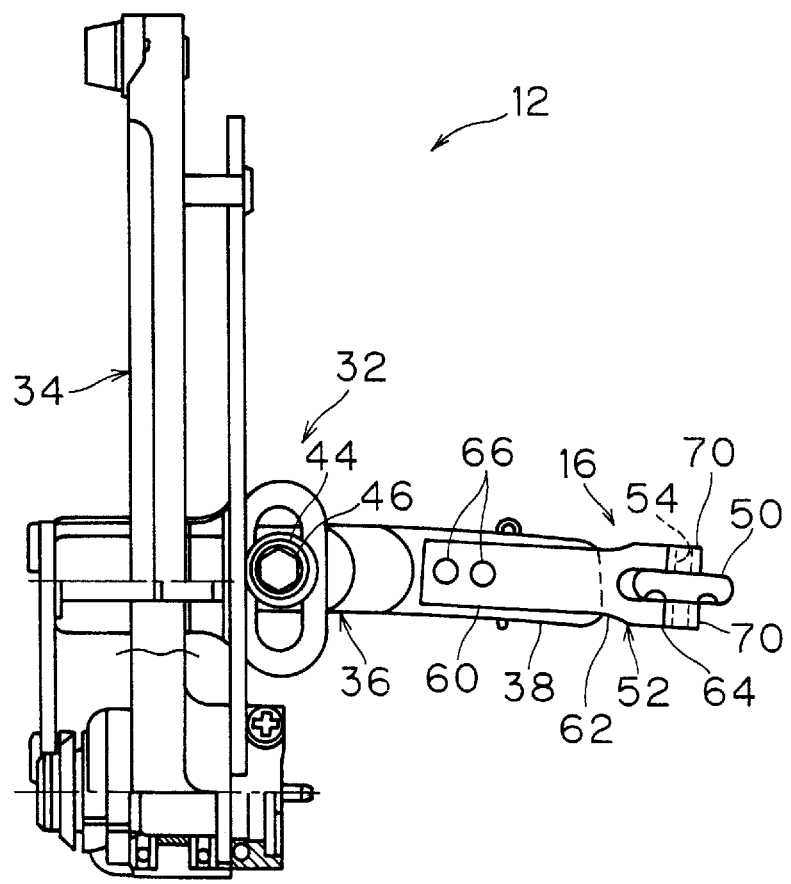
FIG. 3 is a partial side elevational view of the braking device and brake adjusting devices illustrated in FIG. 2, but with the brake adjusting devices extending in a rearward direction and with certain portions broken away for purposes of illustration.

Braking device 12 is illustrated as being coupled to front fork 14 of bicycle 10 in a relatively conventional manner. Of course, it will be apparent to those skilled in the art from this disclosure that braking device 12 can be coupled to the rear forks of bicycle 10 in a conventional manner. As shown in FIGS. 2 and 3, braking device 12 is a "V-Brake" which is manufactured by Shimano, Inc. in its XTR line and its DEORE XT line of bicycle components, except that braking device 12 has been provided with a pair of brake adjusting devices 16 in accordance with the present invention. In FIG. 2, brake adjusting devices 16 are mounted to extend forwardly from braking device 12, while in FIGS. 3 and 4, brake adjusting devices 16 are mounted to extend rearwardly from braking device 12. Of course, it will also be apparent to those skilled in the art from this disclosure that brake adjusting devices 16 can be mounted in a variety of ways and can be utilized with cantilever braking devices, disc brakes and other types of braking devices.

Basically, braking device 12 is coupled to the front fork 14 of bicycle 10 such that it can move between a release position and a brake position. In the release position, braking device 12 does not engage rim 20 so that wheel 18 is free to rotate. In the brake position, braking device 12 is pivoted to grip rim 20 of wheel 18 to prevent rotation of wheel 18. In particular, the rider will operate the brake operating device 22 which in turn will pull cable 24 to cause braking device 12 to engage rim 20 of wheel 18. More specifically, braking device 12 has a pair of brake mechanisms 32 which are pivotally coupled to front fork 14. Each of the braking mechanisms 32 have a brake arm 34, a four-bar link mechanism 36, a pair of friction pad supports or brake shoe holders 38, and a pair of friction pads 40, respectively. The upper ends of brake arms 34 are interconnected by a link 42 and an end of cable 24 such that brake mechanisms 32 pivot together in a conventional manner. The pad supports 38 are coupled to brake arms 34 by a center post 44 and a nut 46.

Since most braking devices are well-known to those skilled in the art, braking device 12 and bicycle 10 will only be discussed and illustrated to the extent needed to understand the brake adjusting devices 16 of the present invention.

Figure 4:
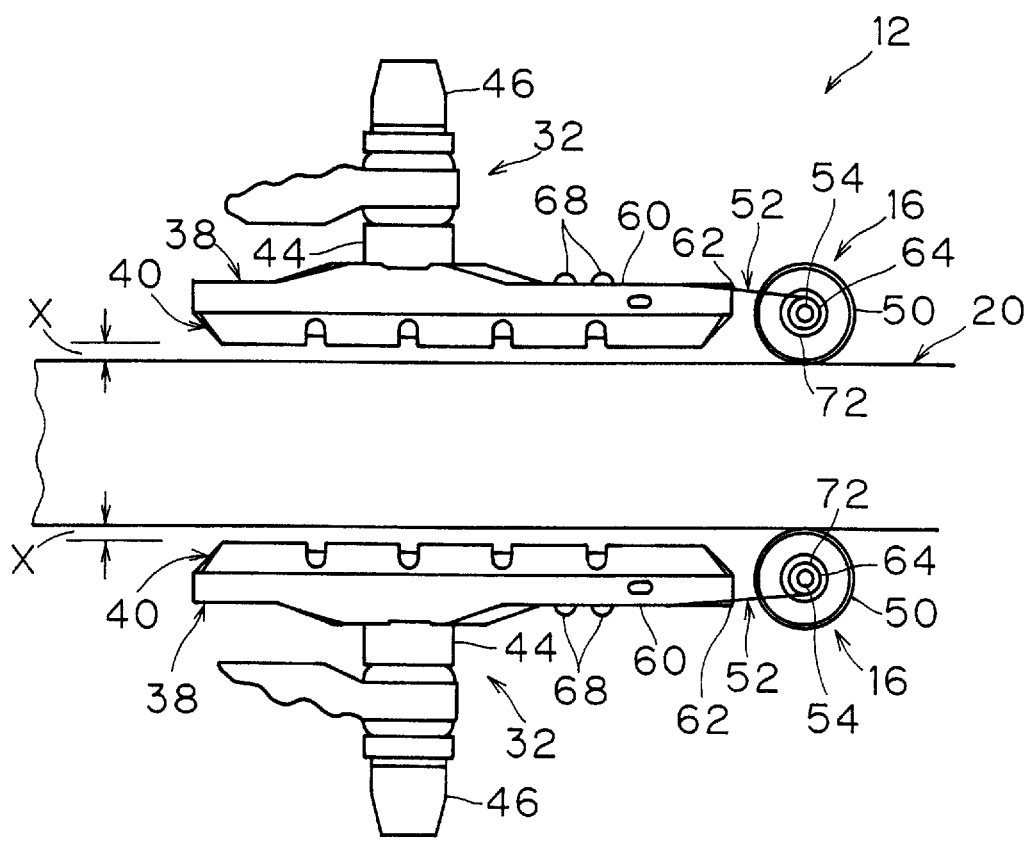
FIG. 4 is a partial top plan view of the braking device with brake adjusting devices attached thereto as illustrated in FIG. 3, with the brake adjusting devices being coupled to the brake shoe holders and engaging the rim of the bicycle wheel.

As seen in FIG. 4, brake adjusting devices 16 are substantially identical to each other and are designed to engage rim 20 to obtain the desired brake pad spacing X between the face of friction pads 40 and rim 20. In this embodiment, rim 20 acts as a friction member which is engaged by friction pads 40 for stopping the rotation of wheel 18. It is desirable to have the brake pad spacing X as small as possible, yet avoid friction pads 40 from rubbing against rim 20 when the brakes are in the release position. Accordingly, brake adjusting devices 16 apply a force against rim 20 so that friction pads 40 are biased outwardly from rim 20. This allows the rider to adjust braking device 12 to minimize the brake pad spacing X without fear of friction pads 40 rubbing against rim 20. Preferably, each brake adjusting device applies a force of at least about 0.5 to about 1.5 kilograms against the friction member, e.g., rim 20 to keep friction pads 40 from rubbing against the friction member, e.g., rim 20.

Brake adjusting devices 16 each include a spacing element 50 which slidably engages rim 20 and a support member 52 for coupling spacing element 50 to brake mechanism 32. In this embodiment, spacing element 50 is preferably in the form of a roller which is designed to rotate with wheel 18 of bicycle 10. Accordingly, spacing element 50 does not produce a significant amount of drag on rim 20. Preferably, spacing element 50 is also constructed of a material having a low coefficient of friction such as a Teflon material. Of course, other types of suitable materials could be utilized as needed and/or desired.

Spacing element 50 is rotatably coupled to support member 52 via a pivot pin 54. Pivot pin 54 can be either integrally formed with spacing element 50 as a one-piece, unitary member, or can be a separate element which extends through the center of spacing element 50. While spacing element 50 is illustrated as a roller, it will be obvious to those skilled in the art that other types of spacing elements can be utilized, including spacing elements which do not rotate with wheel 18.

Support member 52 is preferably constructed of a resilient material which can apply a sufficient force to obtain the proper brake pad spacing X. For example, support member 52 can be constructed of a spring metal. Support member 52 basically includes an attachment portion 60, a biasing portion 62 and a retaining portion 64. Preferably, attachment portion 60, biasing portion 62 and retaining portion 64 are integrally formed as a one-piece, unitary member which is coupled between pad support 38 and spacing element 50.

Attachment portion 60 has a pair of mounting holes 66 for receiving fasteners 68 therein to secure brake device 16 to pad support 38. Fasteners 68 can be any type of conventional fastener. For example, fasteners 68 can be rivets for permanently coupling adjusting devices 16 to pad supports 38 or can be screws for releasably coupling adjusting devices 16 to pad supports 38. Moreover, attachment portion 60 can be modified such that brake adjusting device 16 can be coupled to other parts of braking device 12. For example, attachment portion 60 can be coupled to center post 44 via nut 46.

Biasing portion 62 is in the form of a leaf spring which is an extension of attachment portion 60. Biasing portion 62 should be configured such that the engagement surface of spacing element 50 applies a constant force against rim 20. In other words, biasing portion 62 should normally be under stress.

Retaining portion 64 is preferably fork-shaped and has a pair of legs 70 which are spaced apart for receiving spacing element 50 therebetween. The ends of the legs have loops 72 for receiving pivot pin 54 therein in such a manner that spacing element 50 can rotate relative to retaining portion 64. For example, pivot pin 54 can be fixedly coupled to spacing element 50 and rotatably received within loops 72 of retaining portion 64 or pivot pin 54 can be fixed within loops 72 of retaining portion 64 and spacing element 50 can be rotatably coupled to pivot pin 54. In either case, spacing element 50 should be arranged to freely rotate about the axis of pivot pin 54.

In operation, when the rider operates the brake lever of brake operating device 22, the inner wire of cable 24 is pulled within the outer casing of cable 24 so that the upper portions of brake arms 34 are pulled inwardly. Thereafter, friction pads 40 on brake shoe holders or pad supports 38 are pressed against the side surfaces of rim 20, thus causing a braking action to be performed. As a result of the braking action, the biasing portions 62 of each of the brake adjusting devices 16 are further stressed. Once the rider releases the brake lever of brake operating device 22, the brake wire of cable 24 is relaxed so that coil springs within the brake arm cause the brake arms 34 to pivot in the opening direction. As a result, the tip ends of the friction pads 40 on the brake shoe holders 38 are withdrawn from the side surfaces of rim 20 so that the braking action is released. To further ensure release of friction pads 40 from rim 20, the biasing portion 62 of the brake adjusting devices 16 provide an additional urging force to ensure release of friction pads 40 from the sides of rim 20.

Figure 5:
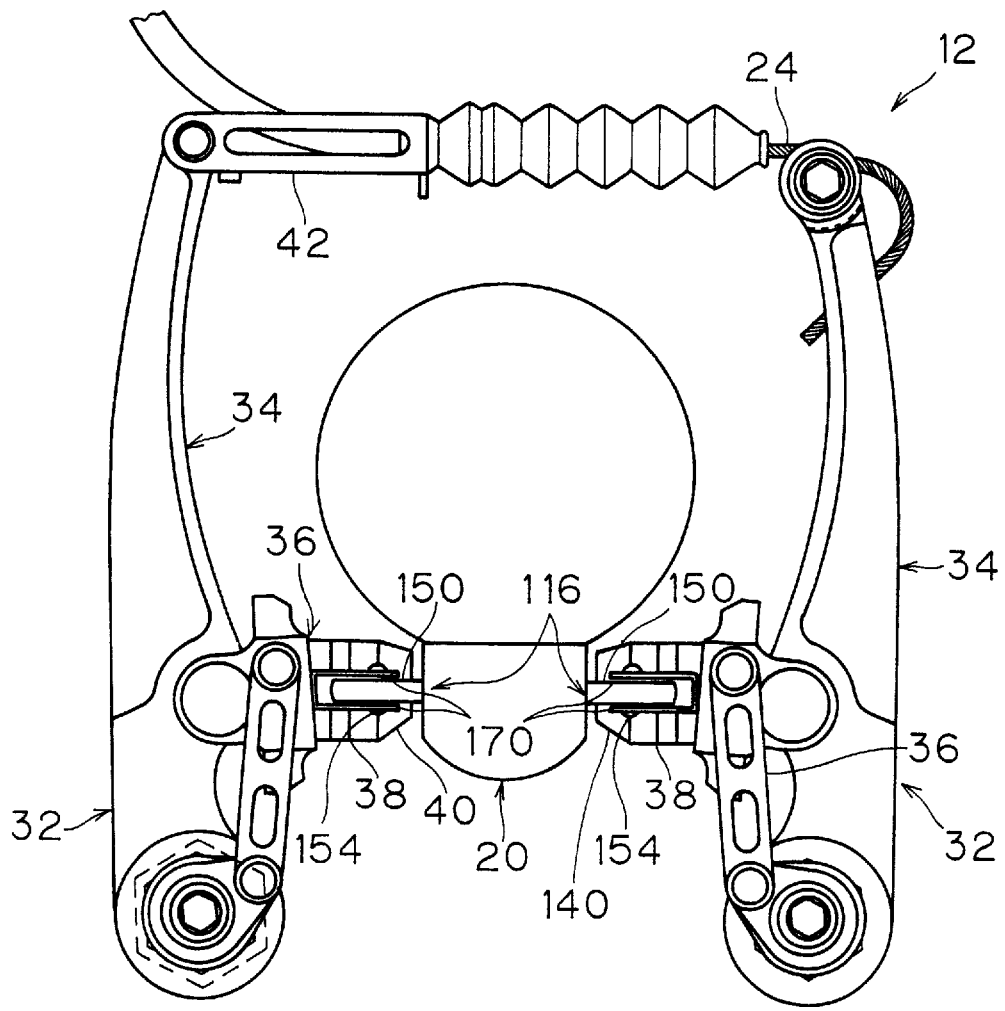
FIG. 5 is a partial front elevational view of a braking device with brake adjusting devices attached thereto in accordance with a second embodiment of the present invention.
Figure 6:
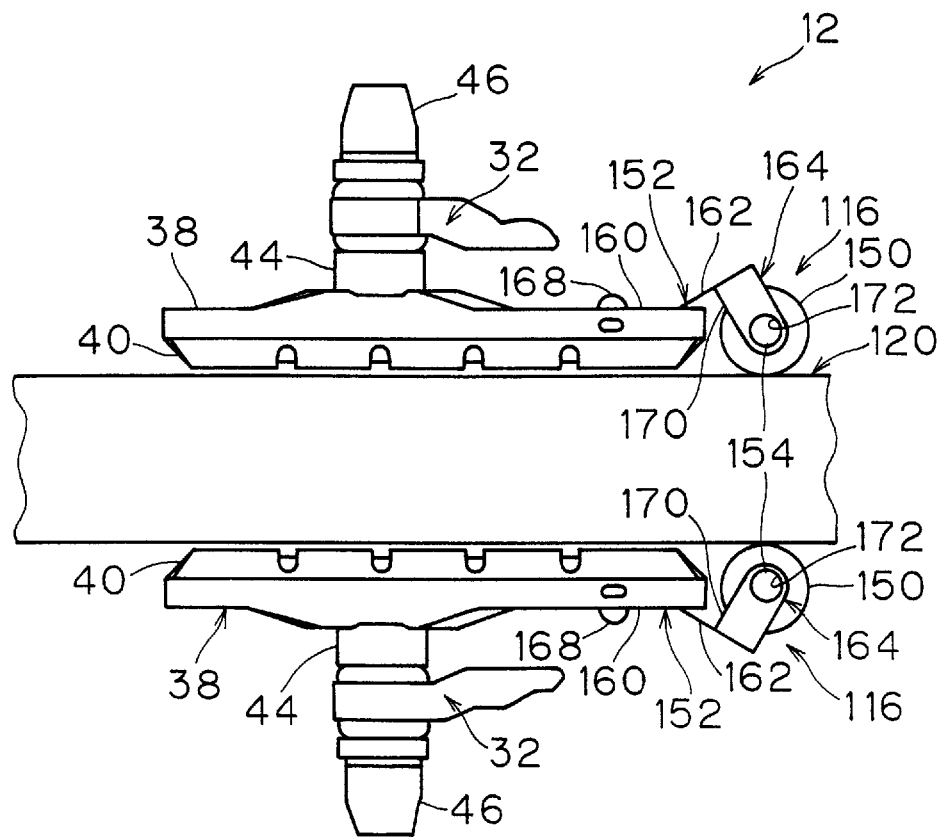
FIG. 6 is a partial top plan view of the braking device with brake adjusting devices attached thereto as illustrated in FIG. 5, with the brake adjusting devices being coupled to the brake shoe holders and engaging the rim of the bicycle wheel.

Second Embodiment of FIGS. 5 and 6

As seen in FIGS. 5 and 6, a pair of brake adjusting devices 116 are illustrated in accordance with a second embodiment of the present invention. Brake adjusting devices 116 are coupled to braking device 12, in substantially the same manner as brake adjusting devices 16, as discussed above. In view of the similarities between brake adjusting devices 16 and brake adjusting devices 116, brake adjusting devices 116 will only be briefly discussed herein.

Similar to the first embodiment, each of the brake adjusting devices 116 has a support member 152 with an attachment portion 160, a biasing portion 162 and a retaining portion 164. The spacing elements 150 are in the form of rollers. The basic difference between brake adjusting devices 16 and brake adjusting devices 116 is that retaining portion 164 of each brake adjusting device 116 is modified. In particular, legs 170 of retaining portion 164 are flat plates which are spaced apart for rotatably receiving spacing element 150 therebetween. Each of the legs 170 is provided with a pivot hole 172 for receiving pivot pin 154 therein. In this embodiment, the brake adjusting devices 16 extend forwardly from braking device 12.

Figure 7:
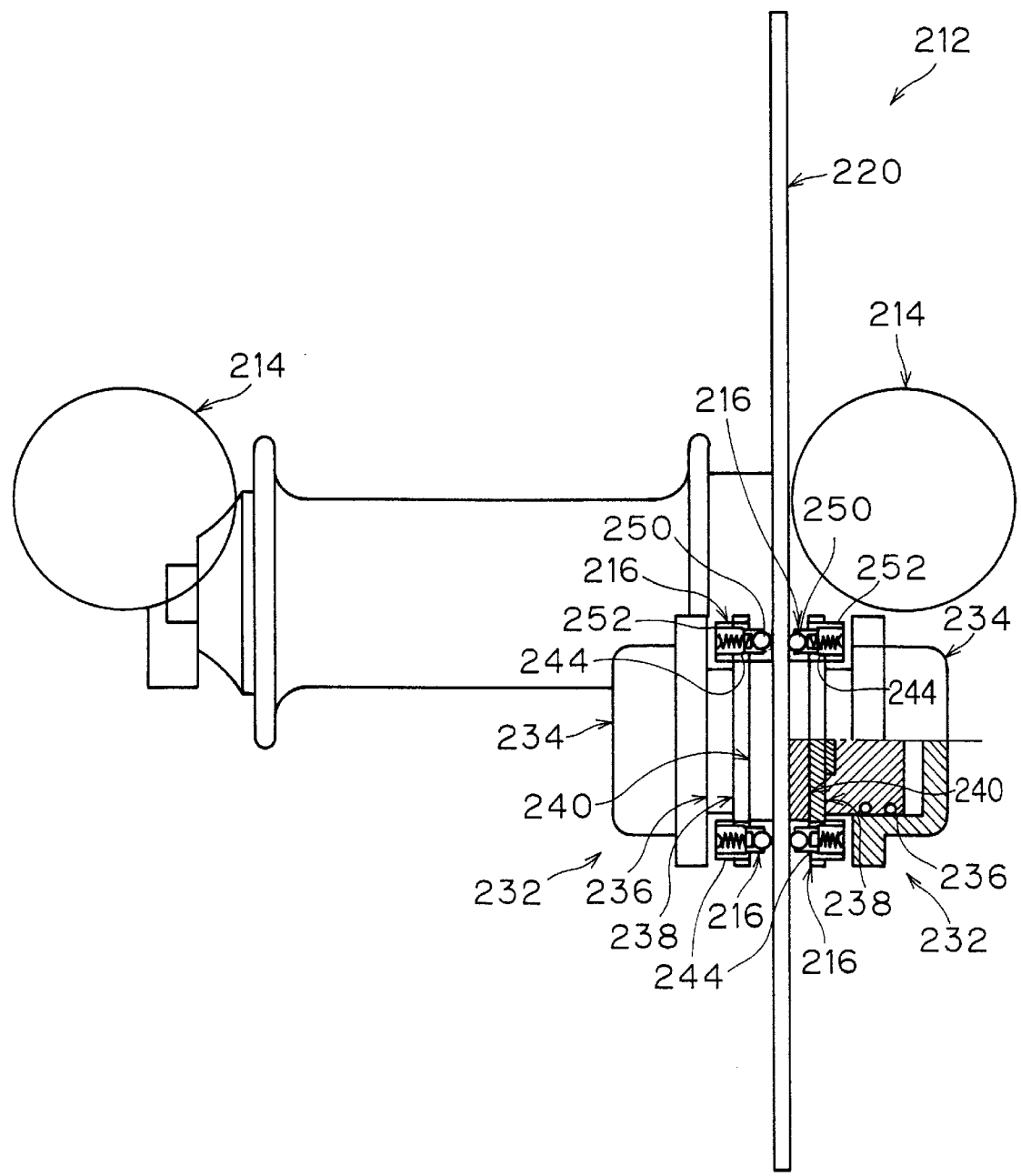
FIG. 7 is a partial top schematic view of a braking device in the form of a disc brake with brake adjusting devices coupled thereto in accordance with a third embodiment of the present invention.
Figure 8:
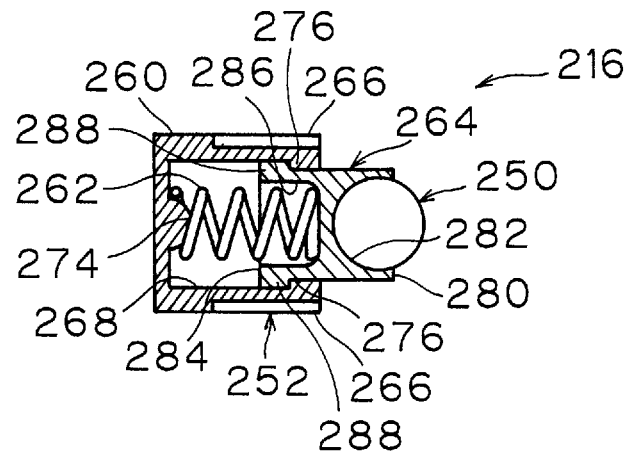
FIG. 8 is an enlarged longitudinal cross-sectional view of one of the brake adjusting devices illustrated in FIG. 7.

Third Embodiment of FIGS. 7 and 8

Referring now to FIGS. 7 and 8, a braking device 212 with a brake adjusting mechanism in accordance with a third embodiment of the present invention is illustrated. Basically, the same principles of the first two embodiments apply to this third embodiment. However, instead of using a V-brake or a cantilever brake, braking device 212 is a disc brake.

Disc brakes are well-known in the art, and thus, braking device 212 will not be discussed or illustrated in detail herein. Moreover, the actuating mechanism for brake device 212 can be modified from the embodiment disclosed and illustrated herein so as to be similar to the disc brake disclosed in U.S. Pat. No. 3,680,663 to Kine, the disclosure of which is hereby incorporated herein by reference.

In this embodiment, braking device 212 is fixedly coupled to front fork 214 in a relatively conventional manner such that braking device 212 engages disc 220 (friction member) of wheel 218. Braking device 212 includes a pair of fluid brake mechanisms 232 which are substantially identical to each other. Each of the braking mechanisms 232 includes a housing 234, a piston 236 movably coupled within housing 234, a brake shoe holder or pad support 238 coupled to piston 236 and a friction pad 240 coupled to pad support 238. Pad supports 238 each have at least two brake adjusting devices 216 coupled thereto. In particular, pad supports 238 are provided with a pair of threaded holes 244 for threadedly receiving a brake adjusting device 216 in each of the threaded holes.

Brake adjusting devices 216 each includes a spacing element 250 and a support member 252 for holding spacing element 250 against friction member or disc 220 to apply a constant force to obtain desired brake pad spacing.

Spacing element 250 in this embodiment is preferably a ball which is rotatably coupled to support member 252 such that as disc 220 rotates with wheel 218, spacing element 250 also rotates therewith. Spacing element 250 is preferably constructed of a material having a low coefficient of friction so as to minimize drag against disc 220. For example, spacing element 250 could be constructed of Teflon or a smooth metallic material.

Support member 252 includes an attachment portion 260, a biasing portion 262 and a retaining portion 264. Attachment portion 260 is preferably a substantially cylindrical member having external threads 266 for threadedly engaging threaded holes 244 of friction pad supports 238 and an internal blind bore 268 for receiving biasing portion 262 and retaining portion 264 therein. The outer surface of attachment portion 260 can also be provided with a non-circular portion which is designed to receive a tool thereon for threading attachment portion 260 into holes 244 of friction pad supports 238. Blind bore 268 is preferably provided with a protrusion or bump 274 on its bottom surface for locating one end of biasing portion 262 therein and an internal shoulder 276 for limiting movement of retaining portion 264 within blind bore 268.

In this embodiment, biasing portion 262 is preferably a compression spring. Of course, it will be apparent to those skilled in the art from this disclosure that other types of biasing members could be utilized within blind bore 268. Biasing portion 262 has one end engaging the protrusion 274 located at the bottom of blind bore 268 and a second end engaging retaining portion 264 for biasing retaining portion 264 outwardly relative to attachment portion 260.

Retaining portion 264 has a first end 280 with a semi-spherical recess 282 and a second end 284 with a recess 286. Recess 282 is designed to rotatably receive spacing element 250 therein, while recess 286 is designed to receive one end of spring element 262 therein. The outer surface of retaining portion 264 is preferably provided with a shoulder 288 for engaging the ledge 276 of attachment portion 260 for limiting the outward movement of retaining portion 264 relative to attachment portion 260 via biasing portion 262. Retaining portion 264 can be coupled to attachment portion 260 via a bayonet-type mount such that once retaining portion 264 is coupled to attachment portion 260, retaining portion 264 can move axially within blind bore 268 against the force of biasing portion 262.

Figure 9:
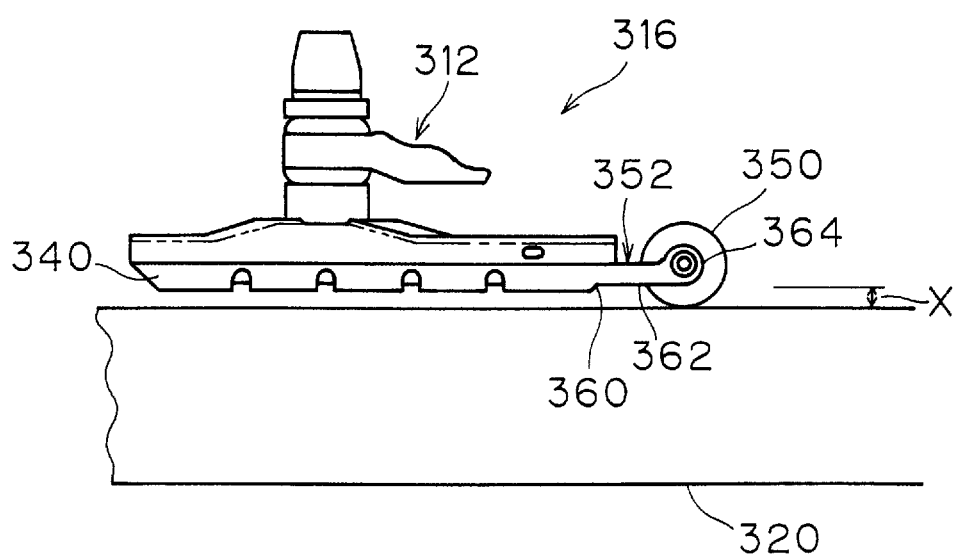
FIG. 9 is a partial top plan view of one brake adjusting device in accordance with a fourth embodiment of the present invention.

Fourth Embodiment of FIG. 9

In the embodiment of FIG. 9, the brake adjusting device 316 is an integral part of brake pad 340. More specifically, brake adjusting device 316 includes a spacing element 350 having a support member 352 for holding spacing element 350 against friction member or rim 320 to obtain the desired brake pad spacing.

In view of the similarities of the brake adjusting device 316 to the brake adjusting devices discussed above, brake adjusting device 316 will not be discussed or illustrated in detail herein. In particular, only one brake adjusting device 316 is illustrated as being coupled to the braking device 312 such that it extends forwardly therefrom.

Spacing element 350, in this embodiment, is preferably a roller which is rotatably coupled to support member 352 such that as rim 320 rotates with the wheel, spacing element 350 can also rotate therewith. Spacing element 350 is preferably constructed of a material having a low coefficient of friction so as to minimize drag against rim 320. In any event, it will be obvious to those skilled in the art that spacing element 350 has a lower coefficient of friction than friction pad 340.

Support member 352 in this embodiment includes an attachment portion 360, a biasing portion 362 and a retaining portion 364. Attachment portion 360, biasing portion 362 and retaining portion 364 are all integrally formed with friction pad 340 as a one-piece, unitary member. Due to the resiliency of the material of biasing portion 362, a leaf spring is formed by biasing portion 362 between brake pad 340 and retaining portion 364. Biasing portion 362 is arranged so that spacing element 350 protrudes farther outwardly from the brake pad 340 so that it engages rim 320 prior to the main surface of brake pad 340. Accordingly, braking device 312 can be adjusted such that the desired brake pad spacing X is obtained between friction 340 and rim 320.

While only fourth embodiments of the present invention have been described and illustrated, it will be apparent to those skilled in the art once given this disclosure that various modifications, changes, improvements and variations may be made without departing from the spirit or scope of this invention as defined in the following claims.

What is claimed is:

1. A brake adjusting device for obtaining desired spacing for a brake pad, comprising:
    a rotatable spacing element adapted to contact a surface of friction member coupled to a wheel for rotation therewith, said spacing element having a frictional resistance less than the brake pad against the friction member and being capable of 360° of rotation;
    a retaining portion rotatably supporting said rotatable spacing element; and
    a biasing portion having a first end coupled to said retaining portion for biasing said spacing element towards the friction member, said rotatable spacing element being movably supported by said retaining portion and biasing portion to move a direction primarily perpendicular to the surface of the friction member.

2. A brake adjusting device for obtaining desired spacing for a brake pad, comprising:
    a rotatable spacing element adapted to contact a friction member coupled to a wheel for rotation therewith, said spacing element having a frictional resistance less than the brake pad against the friction member and being capable of 360° of rotation; said spacing element having a narrower width than the brake pad; and
    a biasing portion coupled to said spacing element for biasing said spacing element towards the friction member.

3. A brake adjusting device according to claim 1, further comprising
    an attachment portion adapted to be coupled to the braking device.

4. A brake adjusting device according to claim 1, wherein said spacing element is rotatably coupled relative to said biasing portion.

5. A brake adjusting device for obtaining desired spacing for a brake pad, comprising:
    a rotatable spacing element adapted to contact a friction member coupled to a wheel for rotation therewith, said spacing element having a frictional resistance less than the brake pad against the friction member and being capable of 360° of rotation; and
    a biasing portion coupled to said spacing element for biasing said spacing element towards the friction member, said biasing portion being a leaf spring arrangement.

6. A brake adjusting device for obtaining desired spacing for a brake pad, comprising:
    a rotatable spacing element adapted to contact a friction member coupled to a wheel for rotation therewith, said spacing element having a frictional resistance less than the brake pad against the friction member and being capable of 360° of rotation;
    a biasing portion coupled to said spacing element for biasing said spacing element towards the friction member; and
    an attachment portion adapted to be coupled to a braking device, and a retaining portion coupled to said spacing element,
    said biasing portion, said attachment portion and said retaining portion being integrally formed as a one-piece, unitary member.

7. A brake adjusting device according to claim 1, wherein said spacing element is a roller.

8. A brake adjusting device according to claim 1, wherein said biasing portion is a compression spring.

9. A brake adjusting device according to claim 1, wherein said spacing element is a ball.

10. A brake adjusting device according to claim 1, wherein
    said biasing portion is integrally coupled directly to the brake pad.

11. A brake adjusting device according to claim 10, wherein
    said spacing element is a roller.

12. A brake pad unit adapted to contact a friction member coupled to a wheel for rotation therewith, comprising:
    a pad support;
    a friction pad fixedly coupled to said pad support, said friction pad having a friction surface adapted to contact the friction member; and
    a brake adjusting device effectively coupled to said friction pad, said brake adjusting device including
        a rotatable spacing element adapted to contact the friction member coupled to a wheel for rotation therewith, said spacing element having a contact surface with a frictional resistance less than said brake pad against the friction member, said spacing element being capable of 360° of rotation, and
        a biasing portion coupled to said spacing element for biasing said spacing element towards the friction member, said spacing element having a contact surface which is adapted to engage the friction member to form a first tangent plane therebetween, said friction surface of said brake pad which is adapted to engage the friction member to form a second tangent plane therebetween, second tangent plane being parallel to said first tangent plane.

13. A brake pad unit according to claim 12, further comprising
    an attachment portion for effectively coupling said brake adjusting device to said friction pad.

14. A brake pad unit according to claim 13, further comprising
    said biasing portion is located between said spacing element and said attachment portion for biasing said spacing element towards the friction member to obtain desired spacing of said brake pad relative to the friction member.

15. A brake pad unit according to claim 13, wherein
    said spacing element is rotatably coupled relative to said attachment portion.

16. A brake pad unit adapted to contact a friction member coupled to a wheel for rotation therewith, comprising:
    a pad support;

a friction pad fixedly coupled to said pad support, said friction pad having a friction surface adapted to contact the friction member; and a brake adjusting device effectively coupled to said friction pad, said brake adjusting device including a rotatable spacing element adapted to contact the friction member coupled to a wheel for rotation therewith, said spacing element having a contact surface with a frictional resistance less than said brake pad against the friction member, said spacing element being capable of 360° of rotation, and a biasing portion coupled to said spacing element for biasing said spacing element towards the friction member, said biasing portion being a leaf spring.

17. A brake pad unit adapted to contact a friction member coupled to a wheel for rotation therewith, comprising:

a pad support;

a friction pad fixedly coupled to said pad support, said friction pad having a friction surface adapted to contact the friction member; and a brake adjusting device effectively coupled to said friction pad, said brake adjusting device including a rotatable spacing element adapted to contact the friction member coupled to a wheel for rotation therewith, said spacing element having a contact surface with a frictional resistance less than said brake pad against the friction member, said spacing element being capable of 360° of rotation, a biasing portion coupled to said spacing element for biasing said spacing element towards the friction member, and an attachment portion for effectively coupling said brake adjusting device to said friction pad, said biasing portion and said attachment portion being integrally formed as a one-piece, unitary member.

18. A brake pad unit according to claim 12, wherein said spacing element is a roller.

19. A brake pad unit according to claim 12, wherein said biasing portion is a compression spring.

20. A brake pad unit according to claim 12, wherein said spacing element is a ball.

21. A brake pad unit according to claim 12, wherein said biasing portion is integrally coupled directly to the brake pad.

22. A brake pad unit according to claim 21, wherein said spacing element is a roller.

23. A brake pad unit adapted to contact a friction member coupled to a wheel for rotation therewith, comprising:

a pad support;

a friction pad fixedly coupled to said pad support, said friction pad having a friction surface adapted to contact the friction member; and a brake adjusting device effectively coupled to said friction pad, said brake adjusting device including a rotatable spacing element adapted to contact the friction member coupled to a wheel for rotation therewith, said spacing element having a contact surface with a frictional resistance less than said brake pad against the friction member, said spacing element being capable of 360° of rotation, and a biasing portion coupled to said spacing element for biasing said spacing element towards the friction member, said spacing element having a narrower width than the brake pad.

24. A braking device, comprising:

first and second brake mechanisms adapted to be coupled to a brake operating device for movement between a release position and a brake position;

first and second pad supports fixedly coupled to said first and second brake mechanisms, respectively, for movement therewith;

first and second friction pads fixedly coupled to said first and second pad supports, respectively, for movement therewith; and first and second brake adjusting devices effectively coupled to said friction pads, each of said brake adjusting devices including a rotatable spacing element adapted to contact a friction member coupled to a wheel for rotation therewith, said spacing element having a frictional resistance less than the brake pad against the friction member and being capable of 360° of rotation, and a biasing portion coupled to said spacing element for biasing said spacing element towards the friction member, said spacing element having a contact surface which is adapted to engage the friction member to form a first tangent plane therebetween, said friction surface of said brake pad which is adapted to engage the friction member to form a second tangent plane therebetween, second tangent plane being parallel to said first tangent plane.

25. A braking device according to claim 24, wherein each of said brake adjusting devices includes an attachment portion effectively coupling its respective said spacing element to said first and second friction pads, respectively.

26. A braking device according to claim 25, wherein each of said biasing portions is located between its respective said spacing element and its respective said attachment portion for biasing its respective said spacing element towards the friction member to obtain desired spacing of said friction pads relative to the friction member, respectively.

27. A braking device according to claim 25, wherein each of said spacing elements is rotatably coupled relative to said first and second friction pads, respectively.

28. A braking device, comprising:

first and second brake mechanisms adapted to be coupled to a brake operating device for movement between a release position and a brake position;

first and second pad supports fixedly coupled to said first and second brake mechanisms, respectively, for movement therewith;

first and second friction pads fixedly coupled to said first and second pad supports, respectively, for movement therewith; and first and second brake adjusting devices effectively coupled to said friction pads, each of said brake adjusting devices including a rotatable spacing element adapted to contact a friction member coupled to a wheel for rotation therewith, said spacing element having a frictional resistance less than the brake pad against the friction member and being capable of 360° of rotation, and a biasing portion coupled to said spacing element for biasing said spacing element towards the friction member, said biasing portion including a leaf spring.

29. A braking device according to claim 24, wherein each of said spacing elements is a roller.

30. A braking device according to claim 24, wherein each of said biasing portions is a compression spring.

31. A braking device according to claim 24, wherein each of said spacing elements is a ball.

32. A braking device according to claim 24, wherein each of said biasing portions is integrally coupled directly to said first and second friction pads, respectively.

33. A braking device according to claim 32, wherein each of said spacing elements is a roller.

34. A braking device according to claim 24, wherein each of said spacing elements extends forwardly from its respective said brake mechanism.

35. A braking device according to claim 24, wherein each of said spacing elements extends rearwardly from its respective said brake mechanism.

36. A braking device, comprising:

first and second brake mechanisms adapted to be coupled to a brake operating device for movement between a release position and a brake position;

first and second pad supports fixedly coupled to said first and second brake mechanisms, respectively, for movement therewith;

first and second friction pads fixedly coupled to said first and second pad supports, respectively, for movement therewith; and first and second brake adjusting devices effectively coupled to said friction pads, each of said brake adjusting devices including a rotatable spacing element adapted to contact a friction member coupled to a wheel for rotation therewith, said spacing element having a frictional resistance less than the brake pad against the friction member and being capable of 360° of rotation, and a biasing portion coupled to said spacing element for biasing said spacing element towards the friction member, said spacing element having a narrower width than its respective said friction pad.

* * * * *